United States Patent [19]

Braslaw et al.

[11] 4,159,972

[45] Jul. 3, 1979

[54] DISSOLUTION OF POLYURETHANE FOAMS AND RE-USE OF THE PRODUCTS THEREFROM

[75] Inventors: Jacob Braslaw; Purnachandra Pai, both of Southfield, Mich.

[73] Assignee: Ford Motor Company, Dearborn, Mich.

[21] Appl. No.: 842,865

[22] Filed: Oct. 17, 1977

[51] Int. Cl.$^2$ ................................................ C08J 9/38
[52] U.S. Cl. ..................................... 260/2.3; 521/164; 528/85
[58] Field of Search ................... 260/2.3, 2.5 AT; 528/85

[56] References Cited

U.S. PATENT DOCUMENTS

| | | | |
|---|---|---|---|
| 2,937,151 | 5/1960 | Broeck et al. | 260/2.3 |
| 3,738,946 | 6/1973 | Frulla et al. | 260/2.3 |
| 3,983,087 | 9/1976 | Tucker et al. | 260/2.3 |

Primary Examiner—J. Ziegler
Attorney, Agent, or Firm—Edmund C. Ross, Jr.; Olin B. Johnson

[57] ABSTRACT

A recycling process for flexible polyurethane foam which comprises dissolving the foam in low molecular weight diol, admixing therewith high molecular weight polyol that is suitable for preparation of flexible urethane foam, removing under vacuum low molecular weight diol solvent from the admixture obtained, and recovering the residue which comprises polyol product that may be used to provide new flexible foam with desirable properties including advantageous tear strength.

5 Claims, No Drawings

DISSOLUTION OF POLYURETHANE FOAMS AND RE-USE OF THE PRODUCTS THEREFROM

BACKGROUND OF THE INVENTION

Considerable effort has been heretofore directed to the development of recovery methods for polyurethane scrap materials, particularly polyurethane foams including flexible, rigid and semi flexible foams. One approach in recovery of flexible foam utilizes low molecular weight aliphatic diol to thermally decompose the foam for subsequent processing. (See, for example, U.S. Pat. Nos. 3,983,087; 3,738,946; 3,632,530; 3,300,417; and 2,937,151).

In recovery of flexible foam by thermal decomposition with low molecular weight diol, a separation over a period of time of the decomposition product obtained into two liquid layers has not been an altogether satisfactory consequence. U.S. Pat. No. 3,738,946 describes such consequence and shows mitigation of its effect by preparing rigid foams from balanced proportions of the resultant layers. U.S. Pat. No. 3,983,087 alternatively used particular amounts of certain alkyl substituted low molecular weight diols to provide a single phase decomposition product that is said to be suitable for preparation of certain polyurethane products. U.S. Pat. No. 3,632,530 provides for separating the layers obtained from certain flexible foams by rather extreme reaction conditions and cooling of the dissolution product before further purification.

Each of the approaches in the above-identified patents while evidencing merit, does have certain drawbacks. For example, the type of alkyl substituted glycol utilized in U.S. Pat. No. 3,983,087 may be even more expensive than the polyol originally used in making the flexible foam. Moreover, the process of U.S. Pat. No. 3,738,946 apparently is not seen to be applicable to recycling scrap flexible foam back into products suitable for preparation of new flexible foam. Still further, the process of U.S. Pat. No. 3,632,530 appears to require extended periods for completion.

The method of this invention provides not only a more rapid procedure for recovery of desirable liquid polyol product from the flexible foam, but, furthermore a polyol product that is suitable for use in the preparation of new flexible foam. Rather than proceeding with conditions that necessitate formation of separate liquid layers after heating the flexible foam in the presence the low molecular weight diol, the method herein allows formation and use of a single phase dissolution product. Moreover, economic use of readily available diol is achieved.

Accordingly, it is an object of this invention to provide an improved method for recovery of flexible polyurethane foams as well as to provide improved products therefrom.

THE INVENTION

The method of this invention utilizes low molecular weight aliphatic diols, especially alkylene glycols such as diethylene glycol to thermally dissolve flexible polyurethane foam at temperatures up to 210° C. during periods normally ranging up to about 3 hours. After addition of high molecular weight polyol to the so obtained or obtainable dissolution product, remaining glycol solvent is vacuum distilled (at temperatures preferably below about 170° C. to prevent degradation) to leave a polyol residue that can be reprocessed into new flexible foam with advantageous properties including tear strength. The distilled glycols may be reprocessed to provide further economic advantage.

DETAILED DESCRIPTION OF THE INVENTION

Typical polyurethane flexible foams applicable herein are polymeric reaction products containing urea type and urethane type linkages and are made by reaction of a mixture containing polyisocyanate and high molecular weight (e.g., number average exceeding about 1000) ether or urea polyol.

Polyisocyanates often utilized in making flexible polyurethane foam and especially found suitable for the method herein include aromatic polyisocyanates, particularly those diisocyanates comprising arylene or alkarylene moieties e.g., 2,4-tolylene, 2,6-tolylene and 4,4'-diphenylenemethane as are well known for their use in preparing flexible foam.

The high molecular weight ether or urea polyol typically used in making flexible foam has a molecular weight (number average) in a range below 10,000 as, for example, in a range between about 2000–9000 and the recovery method herein is advantageously applicable to flexible foam made with ether polyols such as polyether triols having a number average molecular weight in a range between about 4000–7500. Moreover, combinations of polyols of varying molecular weights within these ranges are also often used in making flexible polyurethane foams.

Other ingredients often used in preparation of flexible foam that is suitably recovered according to this invention include catalyst, surfactant, water, fillers and other modifiers including amines in minor amounts.

Besides flexible foam, the method herein can utilize other polyurethane e.g., semi-flexible and rigid foams during the dissolution stage as such other polyurethanes can undergo decomposition at these conditions. Recovery of fixed amounts of well characterized flexible foam scrap, however, provides for ease in process control.

The low molecular weight aliphatic diol used in the dissolution of the flexible foam preferably comprises one or more aliphatic diols having up to 6 carbon atoms and of the formula HO-A-OH wherein A is an alkylene that is preferably interrupted by oxy (—O—) groups. Glycols that distill below about 170° C. at below about 10 mm. of Hg are preferred, and diethylene glycol (i.e., 2,2'-dihydroxydiethyl ether) currently constitutes a particularly preferred glycol in view of its relative cost, availability and performance.

The amount of low molecular weight aliphatic diol used in dissolution of the flexible foam is not a critical aspect, providing that a viscosity of the dissolution product is maintained that is convenient for processing. In this regard admixture with high molecular weight polyol used to make the original foam may aid in attaining desired viscosity of the dissolution product. Preferably, the weight ratio of the flexible foam to the low molecular weight diol is between about 2:1–1:2 with a range of above about 1:1 advantageously providing desirable utilization of diol.

In one preferred embodiment the low molecular weight diol is heated to a temperature in a range of up to 210° C., preferably between about 180°-200° C., whereupon the foam is added in small pieces with continuous stirring. Addition of the pieces over a period of time is advantageous. Equal weights of the preferred low molecular weight diol and the foam are able to be dissolved in about one hour and twice as much foam taking about two hours. It appears that catalyst used in making the foam to be recovered promotes the dissolution as the dissolution rate increases with further addition of foam up until viscosity of the dissolution product inhibits adequate mixing.

The conditions under which dissolution is carried out in accordance with this invention are desirably mild and permit attainment of a liquid product which is thereafter preferably admixed with a high molecular weight polyol that is suitable for use in the preparation of flexible, foams, preferably the same type of polyol that is used as a starting material in making the flexible foam that is being recovered. For example, if the flexible urethane foam is made with a polyether triol it is desired to use a polyether polyol, especially the same polyether triol, for admixture with the liquid dissolution product. Thus, one may simply look to the high molecular weight polyol that is used in preparation of any given foam for examples of the type of high molecular weight polyol suitable for the method herein.

The subsequent addition of high molecular weight polyol has an advantage of reducing viscosity of the dissolution product but earlier addition may also be possibly of advantage in aiding dissolution and reducing viscosity of the dissolution mixture if desired.

Since the conditions under which the flexible foam are dissolved in low molecular weight diol, and, optionally high molecular weight polyol that is suitable for use in preparation of new foam are mild as compared to the prior art procedures, this perhaps accounts in part for the fact that a single or substantially single liquid layer is obtainable during such dissolution. Moreover, attainment of this apparently single or substantially single liquid layer which is relatively stable, e.g. remains unseparated for 2 hours or more evidences that preferred reaction conditions are being employed.

The amount of high molecular weight polyol employed relative to the low molecular weight diol and flexible foam combined may vary widely but are desirably used in amounts that permit adequate viscosity of the admixture for pumping, e.g., about 1:20-10:1 weight ratio of the flexible foam and low molecular weight diol to the high molecular weight polyol. Use of a weight ratio of the added high molecular weight polyol to diol of about 20:1-3:1 is normally sufficient. Optimum ratios will in part depend upon the amount of scrap flexible foam to be recycled relative to the new foam that is being produced.

Low molecular weight diol is removed from the liquid dissolution product comprising the added high molecular weight polyol by heating (preferably at a temperature in a range up to about 180° C.) under vacuum, preferably at below 10 mm. Hg and more desirably below 1 mm. Hg to obtain a recovery product that can be used in preparation of foams, especially flexible foams. The low molecular weight diol removed may be reprocessed for use again in continuous operations.

Desirably, a major portion of the original amount of the low molecular weight diol added is removed, preferably at least about 70% by weight of the original amount used during dissolution, more preferably at least about 90% by weight.

The following examples illustrate this invention and are not intended limiting it to their specific details. All parts are parts by weight and all temperatures are in degrees Centigrade unless specially noted otherwise.

EXAMPLE 1

(a) A flexible polyurethane foam is made from the ingredients of Table I below by rapid mixing of ingredients 1-8 with ingredient 9 (polyisocyanates) for about 15 seconds and pouring the foaming product into a mold whereby a light cream colored flexible urethane foam of 0.034 specific gravity is obtained after a cure of 5-10 minutes at 120° C.

TABLE I

| FORMULATION OF FLEXIBLE POLYURETHANE FOAM | | | |
|---|---|---|---|
| | Material - Source | Parts | Description |
| 1. | Pluracol 535 (Polyol) (BASF) | 75 | 1640 eq. wt. mostly triol |
| 2. | Pluracol 581 (Polyol) (BASF) | 25 | 2078 eg. wt. mostly triol; contains styrene and acrylonitrile |
| 3. | Water | 2.8 | Distilled |
| 4. | Amine (Air Prod.) | 0.14 | Triethylene diamine |
| 5. | Amine (Air Prod.) | 0.20 | Dimethylaminoethyl-morpholine |
| 6. | Glycol (Union Carbide) | 0.10 | 70% bis(2-Dimethylaminoethyl) ether, 30% dipropylene glycol |
| 7. | Surfactant (Dow Corning) | 1.4 | Silicone glycol copolymer |
| 8. | Catalyst (M&T) | 0.015 | Dibutyl Tin Dilaurate |
| 9. | Polyisocyanate (Mobay) | 35.78 | Polymeric Isocyanates, 20% MDI, 80% TDI |

(b) Equal amounts by weight of a virgin flexible foam prepared as in (a) and diethylene glycol (2,2'-dihydroxydiethyl ether) are admixed according to the following procedure. The diethylene glycol is preheated to 180°. Small pieces of foam weighing about 0.01 parts are added slowly with agitation until dissolution occurs whereupon additional pieces are added while the mixture is maintained between 180°-200° C. The total time elapsed for complete dissolution is 40 minutes. The mixture is maintained for an additional one hour and then the heating and stirring is stopped. The end product is dark brown in color with a small amount of solid residue in the bottom. Negligible weight loss is found to occur during dissolution.

(c) To three mixtures each of 100 parts of a liquid mixture of ingredients 1-8 of Table I are mixed, respectively, five, ten and twenty-five parts of the resinous liquid obtained in (b) above. Flexible, low density foams are obtained when 100 parts of the so combined mixture is foamed with 34 parts of the polyisocyanate in Table I.

(d) Fifty parts of the liquid phase obtained in (b) are mixed with 150 parts of Pluracol 535. The mixture is passed through a rotating film evaporator maintained at a pressure of 0.7 mm. Hg and a temperature of 130° C. Collection of the vapors yields twenty-four parts of a light yellow liquid that is identified by infrared analysis to contain essentially diethylene glycol. The non-evaporated resinous liquid remaining weighs 175 parts. A single liquid phase remains after allowing this liquid to stand for over 72 hours.

(e) Flexible foam is prepared in accordance with the foaming procedure above in (a) using the formulation of Table I except that the 25 parts of Pluracol 535 is replaced with the above obtained resinous liquid of (d) at equal parts by weight. The resultant flexible foam is a material with greater tear strength than the foams obtained from using the dissolution product described above in (c) that does not utilize subsequent distillation of glycol.

EXAMPLE 2

The procedures of Example 1 are followed except that similar size pieces of 200 parts of the same virgin flexible foam are added to 100 parts of the diethylene glycol over a period of 80 minutes. Fifty parts of the resultant liquid are added to one hundred fifty parts of Plurocol 535. Distillation under the conditions of Example 1 (d) provides vapors weighing 12.5 parts with 186 parts recovered as the liquid residue. The foam achieved using this liquid residue is similar in characteristics as that of the foam similarly prepared in Example 1 and of greater tear strength than foam prepared without distillation of the glycol in 1 (c).

EXAMPLE 3

The procedures of Example 1 (b) are repeated except that the additional one hour heating and stirring is omitted. Essentially similar results are obtained.

What is claimed is:

1. In a method for recovery of flexible urethane foam made from reacting a mixture comprising polyisocyanate and polyol having a number average weight exceeding about 1000, wherein the foam is liquified at elevated temperatures in the presence of aliphatic diol of the formula HO-A-OH wherein A is oxy interrupted alkylene and up to 6 carbons, an improvement that permits recovery of products suitable for use in preparing new flexible foam, which comprises:
   (a) dissolving the foam in the presence of the diol at a temperature in a range up to 210° C. for a time sufficient to form a single or subtantially single liquid layer;
   (b) admixing after the dissolution of (a), liquid polyol (B) having a number average molecular weight of about 1000–10,000, that is suitable for use in preparation of flexible foam;
   (c) removing under vacuum at least about 70% by weight of the diol from the liquid admixture of (b) at a temperature in a range exceeding about 100° C.; and
   (d) collecting the liquid polyol residue from the distilled admixture.

2. The method in accordance with claim 1, wherein the liquid polyol (B) comprises triol.

3. The method in accordance with claim 2, wherein the weight ratio of the diol to the foam ranges from about 1:1–1:2.

4. The method in accordance with claim 3, wherein the weight ratio of the polyol (B) to the starting flexible foam is between about 10:1–1:1.

5. The method in accordance with claim 1 wherein the diol is selected from the group consisting of diethylene glycol, and dipropylene glycol.

* * * * *